P. B. GREEN.
Hand-Seeder.
No. 17,089.                                                Patented Apr. 21, 1857.
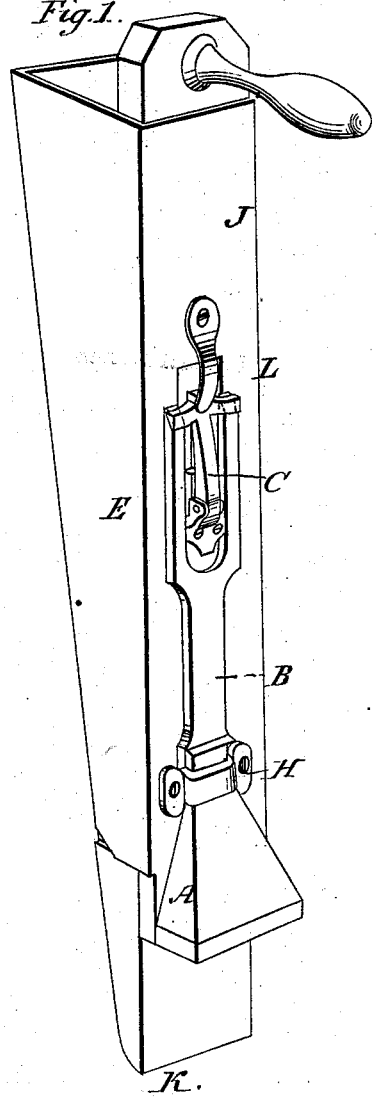
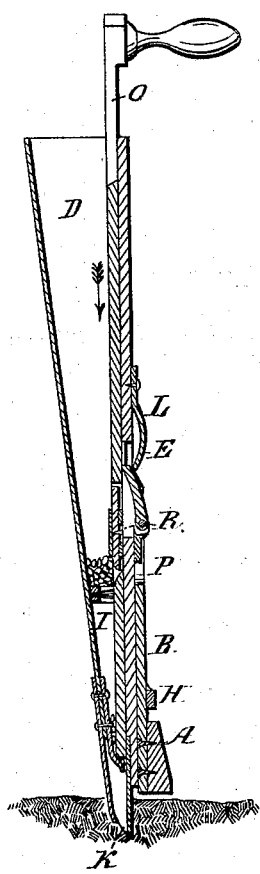
Witnesses.
Abel Blakeslee
William C. Green
Inventor.
Plymon B. Green

UNITED STATES PATENT OFFICE.

PLYMON B. GREEN, OF CHICAGO, ILLINOIS.

IMPROVEMENT IN HAND SEED-PLANTERS.

Specification forming part of Letters Patent No. 17,089, dated April 21, 1857.

*To all whom it may concern:*

Be it known that I, PLYMON B. GREEN, of the city of Chicago, in the county of Cook and State of Illinois, have invented a new and useful Improvement in Seed-Planters for Planting Corn and other Coarse Grain; and I do hereby declare that the following is a full and exact description thereof, reference being had to the accompanying drawings, and to the letters of reference marked thereon.

Figure 1 is a perspective view of the planter. Fig. 2 is a sectional view of the machine in the position of depositing the seed in the earth, and before removing it therefrom.

D is the seed-box; I, bottom of seed-box; J, back of planter; O, plunger; P, cavity in plunger which receives the seed and retains it until it is carried below the bottom of seed-box by the downward motion of the plunger when it falls to the bottom of planter; R, gage to regulate the amount of seed for each hill; A, foot attached to slide; B, slide; C, catch; E, stop attached to plunger; H, guard through which slide B works; L, catch-spring.

On forcing the machine down, the point K enters the earth until the foot A strikes the earth, when the machine slides down on slide B. Slide B wedges out catch C from under the stop E, and the plunger O slides down and forces the seed into the earth, as represented at Fig. 2. At the same time the seed in cavity P is carried below the seed-box and deposited at S. On raising the planter from the earth the plunger slides up and spring L forces the catch C under stop E. Stop E and catch C prevent the plunger from forcing out the seed until the point K enters the earth to a certain depth.

What I claim, and desire to secure by Letters Patent, is—

The combination of slide B, catch C, and stop E, constructed and arranged to hold the plunger stationary until the point K enters the earth to a certain depth, substantially as described.

PLYMON B. GREEN.

In presence of—
ABEL BLAKESLEE,
WILLIAM C. GREEN.